United States Patent

Zmyslowski et al.

[15] 3,657,646

[45] Apr. 18, 1972

[54] METHOD AND APPARATUS OF AUTOMATIC ESTIMATION OF NONREGULAR CURVES, ESPECIALLY ELECTROMIOGRAPHIC CURVES AND THE DIGITAL SYSTEM FOR REALIZATION OF THE METHOD

[72] Inventors: Wojciech Zmyslowski, Warszawa; Zofia Decowska, Warszawa; Ryszard Gawronski, Warszawa; Zdzislawa Borejko, Warszawa; Marek Decowski, Warszawa; Janusz Wirski, Konstancin, all of Poland

[73] Assignee: Polska Akademia Nauk

[22] Filed: Dec. 18, 1969

[21] Appl. No.: 886,093

[30] Foreign Application Priority Data

Dec. 20, 1968  Poland..................................P 130689

[52] U.S. Cl. .............................................324/77 A, 128/2.1
[51] Int. Cl. ........................................................G01r 23/16
[58] Field of Search...............324/77; 128/2.06, 2.10; 129/1, 129/15.5

[56] References Cited

UNITED STATES PATENTS 3,348,031  10/1967  Russell, Jr. et al. ..............324/77 A X
3,422,349  1/1969  Makino................................314/77 A Primary Examiner—Edward E. Kubasiewicz
Attorney—Irvin A. Lavine

[57] ABSTRACT

A method and apparatus for analyzing an irregular signal and providing a digital read-out in which the signal is applied to four processing channels. In a first channel, a coefficient of interference is obtained by counting transitions of the signal through several values, multiplying the sum of the transitions. In a second channel for obtaining mean peak value, the signal is rectified, supplied to a comparator also fed with a constant amplitude saw tooth wave and the time interval obtained between the initiation of the saw tooth wave and the instant when the saw tooth wave potential is equaled by a potential representing the signal intensity. In a third channel, a duty factor is obtained by dividing the signal after it has been integrated by its mean peak value. In a fourth channel the number of groups of impulses in the signal is determined.

7 Claims, 8 Drawing Figures

PATENTED APR 18 1972    3,657,646
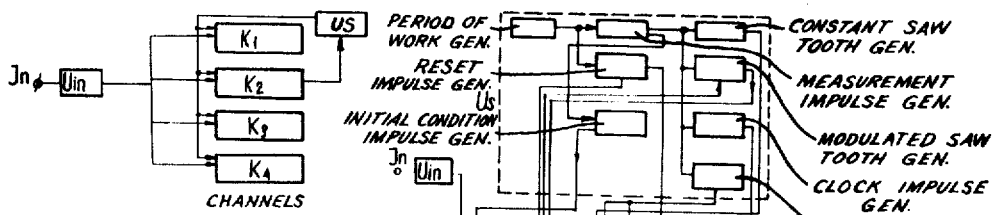
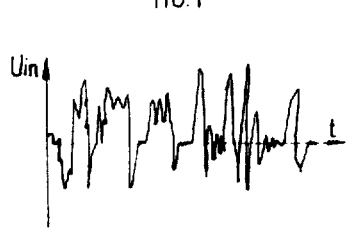
FIG. 1
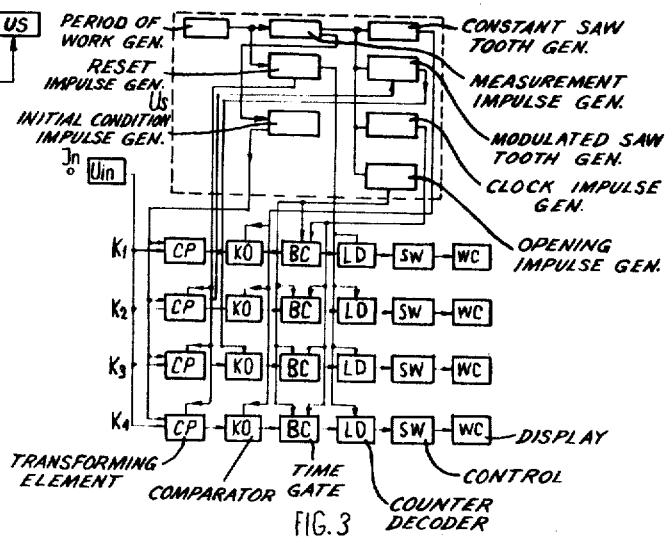
FIG. 3
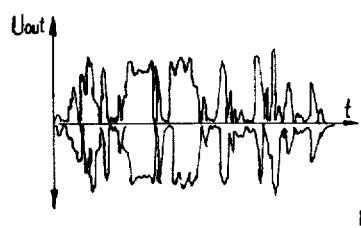
FIG. 2
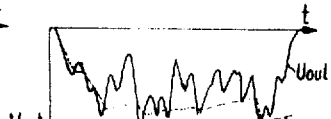
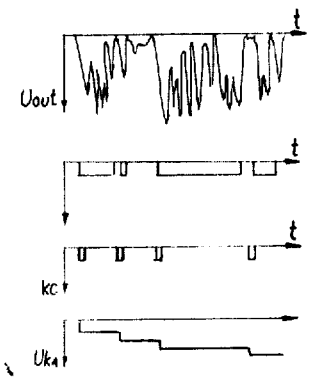
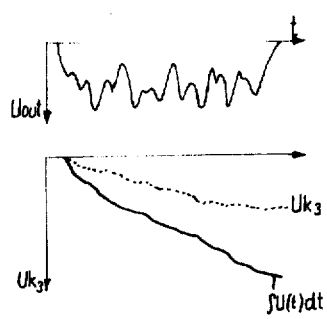
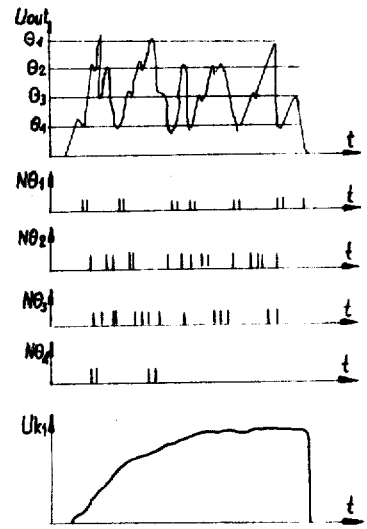
FIG. 5d    FIG. 5c    FIG. 5a
INVENTOR
W. Zmysłowski
Deczuska
R. Gawroński
BY
ATTORNEY

METHOD AND APPARATUS OF AUTOMATIC ESTIMATION OF NONREGULAR CURVES, ESPECIALLY ELECTROMIOGRAPHIC CURVES AND THE DIGITAL SYSTEM FOR REALIZATION OF THE METHOD

The subject of this invention is a method of automatic estimation of irregular curves and especially of electromiographic curves, making it possible to decide whether the investigated curve belongs to the defined class of curves which characterizes a pathologic condition. The invention is embodied in a digital system called the "mioestymator" destined for performing this method.

The estimation and analysis of time electromiographic signals, having irregular wave form was formerly accomplished visually, by observing the curve for example on an oscilloscope or by analysis of a record of the curve obtained from a recording device. This method was inconvenient because of the subjectivity of the estimation by the observer. It should be noted that in the case of observation of curves on an oscilloscope the analysis is long and difficult because the signals are not recorded, and as they are not repeatable because of their unperiodic nature, they do not give any assurance of retaining their values. The estimation of the signals depends on the memory capability of the observer, his training and alertness.

The method including the observing of records of signals is better, but this method is costly and a special treatment of the records is necessary.

The quantitative, accurate estimation of electromyographic curves has not been previously accomplished.

The necessity of accurate analysis of time processing of irregular shaped and especially electromyographic curves arises in medicine when the efficiency of human muscles, which have been affected with a disease, is investigated. In the case mentioned above it is necessary to know the exact efficiency of the muscle before and after therapy.

The purpose of this invention is to give such a method of analysis and estimation of irregular shaped signals and especially of electromyographic curves which make it possible to eliminate the imperfections of methods which were previously used, which provide the estimate in an automatic manner, and which make it possible to decide about the membership of an investigated curve in a given class of curves characterizing the pathologic entity.

The purpose of the invention is also the construction of a system which could be used with typical electromyographs and which would assure the automation of the process of measuremeat and estimation of electromyographic curves.

The essence of the method according to the invention consists in detecting the $k$ quantities characterizing the investigated signal, and especially those are: the coefficient of interference, the mean peak value, the process duty factor and the coefficient characterizing the number of "groups" of impulses in the signal. The detection is accomplished by transforming the investigated signal by means of automatic processing involving such mathematical operations that each of these quantities is particularly defined.

The coefficient of interference is the sum of the products of the number of signal passes of predetermined levels and appropriate factors called "the weight of level." The weight is chosen experimentally.

The detection of interference coefficient is determined by automatic summation of the above-mentioned products.

The mean peak value is understood as a mean value for the chosen time interval from temporal maximum values of the signal. This mean peak value is obtained by the taking of the mean value from peak values in the chosen time interval.

The signal duty factor is the ratio of the integral from the investigated signal for a given time interval to it's mean peak value. This factor is obtained by means of automatic integration and division of the integral by the mean peak value.

The number of groups of impulses in the signal is determined by counting the number of coherent groups of impulses in the given time interval. As a coherent group of impulses we understand the coherent series of impulses with the smallest time of testing equal to 1m. sec. in which the signal is not smaller then 15 percent of its maximum value for a time interval not longer than 10m. sec.

The essence of the digital system for accomplishing the method of automatic estimation, according to the invention, is that the system contains the an input circuit forming the investigated electromyographic curve. The input circuit is connected with four measuring reading out channels detecting quantities characterizing the investigated curve and transforming the output signal of the input circuit. These channels work in parallel and independently. For automation of the curve transforming process each of the channels is connected with a control circuit. Each channel consists of a few elements: transforming element, comparator, time gate, counter decoder, an element supplying appropriate signals to display units and a display unit. All elements but the transforming element are the same in all channels.

The transforming element is of course different in every channel. The digital result is then read out as a digital estimate (from zero to nine) of a given quantity characterizing the investigated curve, being proportional to the intensity of this quantity in the chosen time interval.

The control circuit consists of cyclical generator, a measurement pulse generator, a saw tooth wave generator with constant amplitude, a saw tooth wave generator with modulated amplitude, generator controlling the element leading-in the initial conditions and a reset pulse generator. This circuit controls the measuring-reading out channels.

The present invention apparatus and method provide, with sufficient precision for the purpose of medical diagnostics of muscle diseases, quantities characterizing the electromyographic curves which make it possible to give an estimation of these curves without subjective factors.

FIG. 1 is a circuit diagram of the digital system design in accordance with invention.

FIG. 2 shows the output signal from a electromyograph which is supplied to the input of the circuit of FIG. 1.

FIG. 3 is a block diagram of the circuit of FIG. 1.

FIG. 4 shows the signal at the output of the input circuit.

FIG. 5a shows the signal at the output of the transforming element in the measuring—reading out channel for the coefficient of interference.

FIG. 5b shows the signal at the output of transforming element in the measuring — reading out channel for the mean peak value.

FIG. 5c shows the signal at the output of the transforming element in the channel for duty factor measurement.

$$U_{ka} = f/t.$$

FIG. 5d shows the signal at the output of the transforming element in the channel for the number of groups measurement.

The mioestymator the name given the present invention apparatus, is shown in FIG. 3. It was in this particular case constructed as a transistored device. Such a device could also be constructed using vacuum tubes.

The signal from the electromyograph is shown in FIG. 2. It is an irregular signal or wave form and is supplied to the input of the invention device. The input circuit $V_{in}$ assures the appropriate input resistanc and frequency band. The signal from the electromyograph is rectified and then supplied to the system where the analysis of the signal takes place. The analysis is accomplished in four measuring—reading out channels, wherein there are analysed the coefficient of interference, the mean peak value, the duty factor of the signal and the number of groups of impulses in the signal. These channels are designated: $K_1, K_2, K_3, K_4$.

The channels $K_1, K_2, K_3, K_4$ have the same structure and each of them has at the end a display unit WC, giving the digital estimation of parameters of the signal.

The digital system, or mioestymator, for performing the method according to the invention is shown schematically in FIG. 3. The channels $K_1, K_2, K_3, K_4$ consist of similar elements:

the transforming element CP producing a signal proportional to the intensity of the parameter quantity in the chosen time interval measurement interval, conparator KO, time gate BC, counter decoder LD, system controlling SW the display units WC. These elements cooperate with additional elements from the control circuit US and depending on which channel they are in so in analysis of which from parameters they take part they are connected with the appropriate elements of control circuit.

The functioning of the channels is effected so that the analysis and estimation of quantities characterizing the electromyographic curve occurs in parallel, independently and simultaneously, The analyzed electromyographic curve is a time signal of irregular shape and is shown in FIG. 2.

The signal curve is supplied to input circuit $U_{in}$ of the present invention mioestymator, assuring the appropriate resistance and frequency band.

This signal is formed in the input circuit $U_{in}$.

The signal at the output of the input circuit is shown in FIG. 4 and then is supplied to the transforming elements CP of each of the measuring—reading out channels. In the first channel $K_1$ the coefficient of interference is detected. The signal $U_{k1} = f/t/$ — shown in FIG. 5a — which is proportional to the intensity of a parameter is obtained at the output of transforming element CP. This signal is then processed automatically in the succeeding elements of the channel and displayed on display unit WC in form of digits from zero to nine. The displayed digit provides an indication of the intensity of the analyzed quantity.

The other channels work in a similar way. The $K_2$ channel transforms the signal from the output of input circuit $U_{in}$ for signal $U_{k2} = f/t/$, shown in FIG. 5b informing about the intensity of the mean peak value for a given measurement interval, the channel $K_3$ - transforming the signal from the input circuit $U_{in}$ for the signal $U_{k3} = f/t/$ — shown in FIG. 5c — providing information about the intensity of the duty factor of the signal, the channel $K_4$ transforming the signal from the input circuit $U_{in}$ for the signal $U_{k4} = f/t/$ — shown in FIG. 5d providing information about the number of groups in the given measurement interval.

The elements which comprise the measuring — reading out channels are controlled by appropriate elements of the control circuit US. This circuit generates a series of control impulses which are then supplied to the elements of channels as is shown in FIG. 3.

The control circuit generates the following signals: a signal controlling the period of work (1 sec., 2 sec., 3 sec.), resetting impulses which reset the states of the counters from the previous interval of work, the measurement impulses which key the generator of clock impulses and such forming elements as saw tooth wave generator, timing pulse generator, generator of impulses for opening gates and a generator of impulses supplied to the input of transforming element CP which introduces the initial conditions.

There are two saw tooth wave generators: one generates impulses of constant amplitude and the second generates impulses with amplitude modulated by the value of the mean peak amplitude of the electromyographic signal.

The saw tooth impulses of the second type are then used in channel $K_3$ for duty factor measurement.

The impulses from the clock generator are supplied to all channels. The impulses opening the gates BC, supplied to the gates BC in all channels, are formed from the measurement impulse.

After the end of the measurement impulse and after the measurement is accomplished there is generated an impulse which controls the element leading in the initial conditions; this element is situated in the transforming element CP. This causes the potentials, representing the intensities of particular parameters obtained in the previous period of work of the system in particular channels to take on zero values and then the second period of work begins.

The estimation of parameters of the electromyographic process involves attributing to each parameter a digit from zero to nine depending on the intensity of the parameter in a given time interval. The process of measurement is performed in such a manner that after the end of each period of work lasting 1, 2 or 3 seconds, during which the appropriate data processing signal is produced resulting from the control from the control circuit in the measurement interval lasting 1 m. sec., and then the potential representing the intensity of the parameter is compared with a saw tooth wave. The time interval from the moment of saw tooth wave iniation to the moment when this potential is equal to the potential representiong the intensity of the paremater is of course a linear function of the value of this potential. This time interval is measured by use of impulses a period of 0,1 m. sec. The number of impulses which can pass by the gate in the time interval between the moment of saw tooth wave initiation and the moment when the two potentials become equal, is counted. Then by means of counter, decoder, and element controlling the display units to each series of impulses the displayed digit is attributed.

This digit corresponds to the magnitude of a signal representing a given quantity characterizing the electromyographic curve and is the estimate of this quantity.

With reference to the particular parameters which are characteristic for an electromyographic curve of irregular form the estimation procedure is discussed in detail later.

The measuring—reading out channel $K_1$ for interference coefficient measurement counts the number of transitions of the curve for each of several fiducial levels and then multiplies them by some particular components, the so-called weights of level. By weights of level we mean the additionel coefficients chosen experimentally in such a way so as to assure the best separating of a set of signals for separate classes. The coefficient of interference does not depend on the amplitude of the curve which is of course necessary for the estimate to have any significance. It is obtained by use of an amplifier with automatic gain control. The time constant of the automatic gain control is chosen so that the control acts only when the amplitude changes for a longer time interval, and of couse temporary changes of amplitude, which are the characteristic feature of curve, do not cause any change of gain.

In the channel $K_2$ where the mean peak value is estimated the signal, after rectification is subjected to peak detection. The time constant is chosen so that as a result we obtain the mean peak value and the short-time changes of amplitude which are not representative for the curve are neglected. The mean peak value of the curve for the given period of time is retained and at the end of the measurement interval the readout of this value is provided. This is accomplished by comparison of a potential representing the intensity of the parameter with the saw tooth wave potential. Measuring the time interval between the moment of saw tooth wave potential initiation and the moment when the both potentials become equal we obtain the digital estimation of the given parameter.

The quantity estimating the duty factor is obtained by dividing the value of the integral of the curve by its mean peak value.

This procedure quarantees the independence of the estimation from the curve amplitude. The signal representing the integral of the curve taken in the measurement period is compared with the saw tooth wave potential the amplitude of which is modulated by the mean peak value. It assures the independence mentioned above.

The number of groups of impulses in the investigated curve is obtained by means of the circuit "sticking together" impulses or groups of impulses if the interval between them is not longer then 10 m. sec.

Miostymator according to the invention assures the accuracy demanded in clinical practice and diagnosis. It should be added that owing to the method of analysis and electromyographic curves estimation according to the invention, the estimates are free of subjective factors and have the form of digits, with ease of memorizing and comparing in the case when the diagnosis is performed many times. It is important that the time of examination is about 10 times shorter in comparison with methods used hitherto and the collaboration of a laboratory assistant analyzing records is not necessary.

We claim

1. Apparatus for analyzing an input signal comprising: means for counting the number of times the amplitude of said signal traverses each of a plurality of amplitude values, means for multiplying the sums thus obtained, means for comparing the resulting signal with a saw tooth wave, means for decoding said signal, and means for displaying said decoded signal.

2. Apparatus as set forth in claim 1, and further comprising means for determining the mean peak value of said input signal.

3. Apparatus as set forth in claim 2, said last mentioned means comprising means for rectifying said input signal, means for comparing a potential proportional to said rectified signal with a saw tooth wave, means for measuring the time interval between initiation of said saw tooth wave and the time of equalization of said rectified input signal potential and saw tooth wave potential, and means for displaying a value proportional to said interval.

4. Apparatus as set forth in claim 3, and further comprising saw tooth wave generating means, means for applying a signal proportional to the mean peak value of said rectified input signal to said saw tooth wave generating means to provide a modulated saw tooth wave, means for comparing said integrated signal with said modulated saw tooth wave, and means for counting, decoding and displaying said compared signal.

5. Apparatus according to claim 4, and further comprising means for counting the number of groups of input signal reversals, and means for displaying the sum thereof.

6. Apparatus according to claim 1, and further comprising means for counting the number of groups of input signal reversals, and means for displaying the sum thereof.

7. A method of analyzing a signal comprising:
 a. counting the number of times the amplitude of the signal traverses each of a plurality of amplitude values,
 b. determining the mean peak value of said signal,
 c. integrating said signal and comparing the integrated signal with a saw tooth wave modulated by a signal mean peak value,
 d. counting the number of groups of reversals of said input signal, and
 e. digitally displaying each of the said values.

* * * * *